(12) United States Patent
Waycuilis

(10) Patent No.: US 6,307,191 B1
(45) Date of Patent: Oct. 23, 2001

(54) MICROWAVE HEATING SYSTEM FOR GAS HYDRATE REMOVAL OR INHIBITION IN A HYDROCARBON PIPELINE

(75) Inventor: John J. Waycuilis, Cypress, TX (US)

(73) Assignee: Marathon Oil Compamy, Findlay, OH (US)

( * ) Notice: Subject to any disclaimer, the term of this patent is extended or adjusted under 35 U.S.C. 154(b) by 0 days.

(21) Appl. No.: 09/476,298

(22) Filed: Dec. 30, 1999

(51) Int. Cl.[7] .............................. H05B 6/80; E21B 43/24
(52) U.S. Cl. .................. 219/687; 219/679; 219/695; 219/746; 166/60; 166/248; 137/1; 204/157.15
(58) Field of Search .................. 219/687, 690, 219/679, 695, 696, 746, 748; 166/60, 248; 204/157.15, 157.43, 158.2, 158.21; 137/1, 803

(56) References Cited

U.S. PATENT DOCUMENTS

| | | | |
|---|---|---|---|
| 3,092,514 | * | 6/1963 | Tomberlin .......................... 219/687 |
| 4,067,683 | * | 1/1978 | Klaila ................................. 219/687 |
| 4,193,448 | * | 3/1980 | Jeambey ............................. 166/60 |
| 4,589,434 | | 5/1986 | Kelley ................................. 137/1 |
| 4,678,034 | | 7/1987 | Eastlund et al. ..................... 166/248 |
| 4,853,507 | * | 8/1989 | Samardzija .......................... 219/687 |
| 5,055,180 | * | 10/1991 | Klaila ................................. 166/248 |
| 5,625,178 | | 4/1997 | Rojey ................................. 204/157.15 |

FOREIGN PATENT DOCUMENTS 62-293000  *  12/1987  (JP) .

* cited by examiner

Primary Examiner—Philip H. Leung
(74) Attorney, Agent, or Firm—Jack E. Ebel

(57) ABSTRACT

A microwave heating system is provided including a microwave generator, a fluid pipeline having an upstream section and a downstream section, and a waveguide assembly connected to the microwave generator. The waveguide assembly includes a microwave distributor positioned in the fluid pipeline at a junction between the upstream section and the downstream section. The microwave distributor is in substantially straight line alignment with the upstream section proximal to the junction, while the downstream section is in substantially right angle alignment with the upstream section proximal to the junction. The microwave heating system substantially prevents or remediates gas hydrate blockages in the upstream section of the fluid pipeline at extended distances from the microwave generator. The microwave heating system may also simultaneously control a function of a device remotely positioned on the upstream section or power the remote device.

22 Claims, 4 Drawing Sheets

MICROWAVE HEATING SYSTEM FOR GAS HYDRATE REMOVAL OR INHIBITION IN A HYDROCARBON PIPELINE

TECHNICAL FIELD

The present invention relates generally to a microwave heating system and, more particularly, to a system and method for removing or inhibiting the formation of inclusion complexes in a hydrocarbon fluid pipeline

BACKGROUND OF THE INVENTION

Hydrocarbon fluid pipelines which operate at elevated pressures can become occluded by inclusion complexes in the form of clathrates and, more specifically, in the form of solid-phase gas hydrates. Gas hydrate formation is a well known phenomenon which occurs when free liquid water is present in a hydrocarbon fluid stream flowing through a pipeline and the temperature of the hydrocarbon fluid stream falls below a critical value. The critical temperature value for gas hydrate formation can be in excess of 60° F. in higher pressure pipelines, although the critical temperature value for gas hydrate formation generally decreases as a function of decreasing pressure in the pipeline.

A number of techniques are known in the prior art for preventing or inhibiting gas hydrate formation in hydrocarbon fluid pipelines. One method is to dehydrate the hydrocarbon fluid stream before transporting the hydrocarbon fluid through the pipeline. Another method is to continuously inject a gas hydrate liquid inhibitor composition, such as methanol or glycol, directly into the pipeline where the inhibitor mixes with the flowing hydrocarbon fluid. Yet another method is to wrap the pipeline wall with an electric resistance, heat-tracing cable or a heat-tracing tube containing a circulating hot fluid which elevates the temperature of the pipeline wall. A more recently developed method is to induction heat the pipeline wall using an alternating current. This method requires an electrically isolated parallel conductor in addition to the pipeline itself, such as a second outer metal pipeline surrounding, but insulated from, the original pipeline or a conductor cable running parallel to, but likewise insulated from, the original pipeline.

The above-recited prior art methods for preventing or inhibiting gas hydrate formation are excessively expensive or complex for many off-shore and subsea applications. For example, the prior art method of continuously injecting a gas hydrate liquid inhibitor, such as methanol, into a subsea production pipeline requires the operator to run a separate methanol injection tube to the subsea well head. In addition large quantities of methanol must be handled by the operator and are consumed while practicing the method. The prior art method of induction heating the pipeline wall with an alternating current requires reliable electrical isolation between the original pipeline and the parallel conductor which is extremely difficult to achieve in practice. A short circuit current path could render a large portion of the induction heating system inoperative.

The present invention recognizes a need for a more cost effective and less complex system for preventing or inhibiting gas hydrate formation in hydrocarbon fluid pipelines. Accordingly, it is an object of the present invention to provide a system for inhibiting the formation of gas hydrate blockages in a hydrocarbon fluid pipeline where a liquid water phase is coexistent with one or more hydrocarbon phases. It is another object of the present invention to provide a system for removing gas hydrate blockages in a hydrocarbon fluid pipeline which have formed as the result of unusual pipeline conditions or upsets. It is still another object of the present invention to provide such a system which can be designed as a new installation or which can be readily retrofitted to an existing system. It is yet another object of the present invention to provide such a system which has particular utility to offshore deep water hydrocarbon pipeline applications and to sub sea oil and gas well production flow line applications. These objects and others are achieved in accordance with the invention described hereafter.

SUMMARY OF THE INVENTION

The present invention is a microwave heating system comprising a microwave generator, a fluid pipeline having an upstream section and a downstream section, and a waveguide assembly connected to the microwave generator. The waveguide assembly includes a microwave transition body and a microwave distributor. The microwave distributor is positioned in the fluid pipeline at a junction between the upstream section and the downstream section such that the microwave distributor is in contact with fluids passing through the junction from the upstream section to the downstream section. The upstream section has a circular internal configuration with a substantially continuous open cross-section proximal to the junction. The microwave distributor is in substantially straight line alignment with the upstream section proximal to the junction, while the downstream section is in substantially right angle alignment with the upstream section proximal to the junction. The microwave transition body is positioned between the microwave generator and the microwave distributor and conforms the propagation pattern of microwave signals transmitted by the microwave generator to the internal configuration of the upstream section.

In accordance with one embodiment of the invention, the upstream section has a pipe wall comprising a plurality of layers, including a structural layer and a transmissive layer positioned internal to the structural layer which is substantially less resistant to transmission of microwaves than the structural layer. The pipe wall also has a corrosion resistant layer positioned on the opposite side of the transmissive layer from the structural layer. The corrosion resistant layer is formed from a relatively corrosion resistant material to provide a corrosion barrier.

The microwave heating system is applicable to substantially preventing or remediating inclusion complex blockages in the upstream section of the fluid pipeline at a distance up to about 20 km, and preferably up to about 50 km, or more from the microwave generator. The microwave heating system is also applicable to simultaneously controlling a function of a remote device. The microwave generator employed in the present embodiment has means for frequency or amplitude modulating the microwave signals transmitted thereby to embed information in the microwave signals. The remote device, e.g., a flow control device, is positioned at a point on the upstream section having means for responding to the information embedded in the modulated microwave signals. Alternatively, the microwave generator has means for generating secondary signals in addition to the primary microwave signals. The microwave generator further has means for frequency or amplitude modulating the secondary signals to embed information in the secondary signals. The remote device likewise has means for responding to the information embedded in the modulated secondary signals.

The microwave heating system is also applicable to simultaneously powering an electrically-powered remote device while substantially removing or inhibiting the formation of inclusion complexes in the hydrocarbon fluid pipeline. The remote device is positioned at a point on the upstream section and coupled with an electrical storage battery which powers the remote device. A power absorbing means is coupled with the electrical storage battery to absorb power from the microwave signals propagated through the pipeline and to charge the electrical storage battery with the absorbed power.

The invention will be further understood from the accompanying drawings and description.

DESCRIPTION OF PREFERRED EMBODIMENTS

Figure 1:
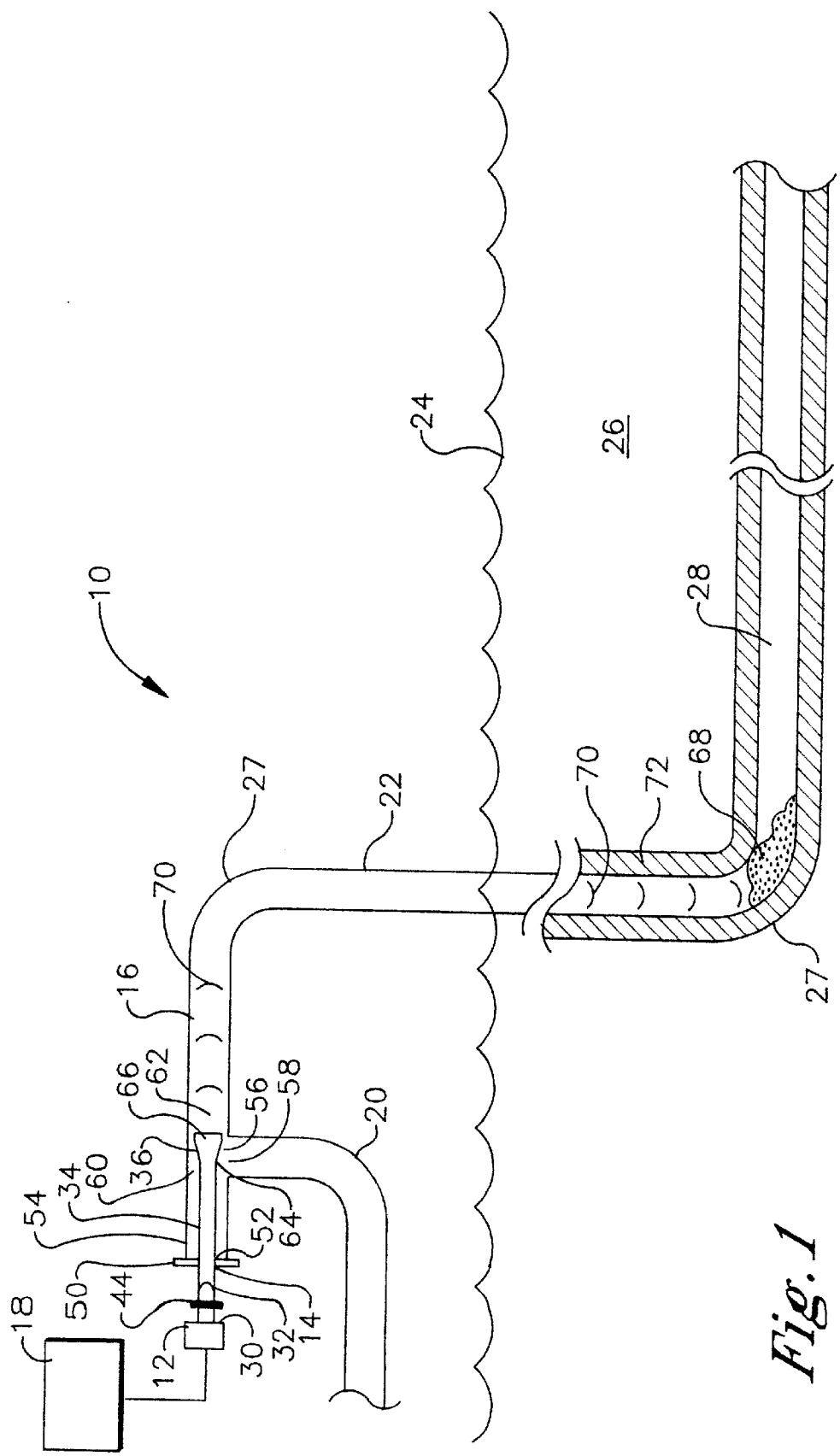
FIG. 1 is schematic view of a microwave heating system of the present invention including an upstream section of a fluid pipeline in cut-away view.

Referring initially to FIG. 1, a microwave heating system of the present invention is shown and generally designated 10. The microwave heating system 10 comprises a microwave generator 12, a waveguide assembly 14, and a fluid pipeline 16. The microwave generator 12 is coupled with a power source 18. The power source 18 is substantially any device capable of supplying the microwave generator 12 with sufficient power to enable the microwave generator 12 to operate in accordance with the requirements set forth below. The microwave generator 12 is preferably a power efficient and relatively low cost device for generating and transmitting microwaves. The particular microwave generator 12 selected for practice of the present invention is, in part, a function of the inside diameter of the fluid pipeline 16. Specifically, a microwave generator 12 is selected which generates and transmits microwaves having a wavelength less than the cut-off wavelength of the fluid pipeline 16.

One device having utility as the microwave generator 12 of the microwave heating system 10 is a magnetron, which is a conventional microwave generator generally designed for industrial process heating applications. Magnetrons are commercially available within a broad size range having a broad power range which extends from a fraction of a kW to many kW's. Magnetrons as a rule generate microwaves at an assigned frequency of 2.45 GHz, which correlates to a free-space wavelength of 12.24 cm. With a magnetron employed as the microwave generator 12 in the microwave heating system 10, the fluid pipeline 16 may generally be substantially any electrically-conductive pipeline which has an internal diameter larger than about 7.1 cm. A pipeline satisfying these characteristics would have a cut-off wavelength longer than 12.24 cm, which would desirably permit transmission of microwave energy from the magnetron and propagation through the interior of the pipeline in a manner required for practice of the present invention as described hereafter.

The fluid pipeline 16 shown in the embodiment of FIG. 1 is an offshore pipeline for conveying hydrocarbon fluids or other fluids produced from a subterranean hydrocarbon-bearing formation. The fluid pipeline 16 has a downstream section 20 and an upstream section 22. The downstream section 20 is preferably positioned above the surface 24 of a marine body 26. In particular, the downstream section 20 is preferably positioned on an offshore platform (not shown). The upstream section 22 of the fluid pipeline 16 extends from above the surface 24 through a series of bends 27 into and through the marine body 26 to a remote source of hydrocarbon fluids (not shown), such as a subsea well.

Figure 2:
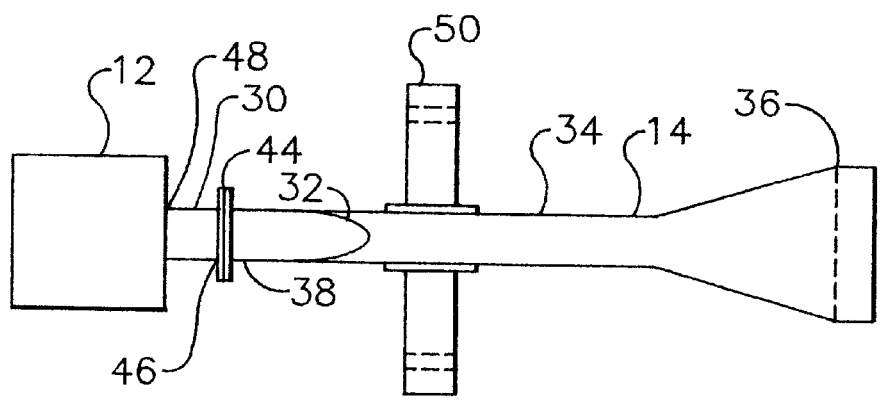
FIG. 2 is a more detailed schematic view of a microwave generator and associated waveguide assembly employed in the microwave heating system of FIG. 1.
Figure 3:
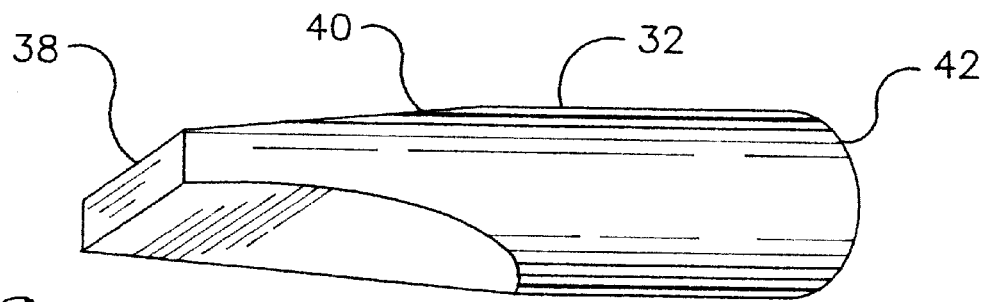
FIG. 3 is a more detailed schematic view of a waveguide transition employed in the microwave heating system of FIG. 1.

The waveguide assembly 14 provides a continuous open path for microwaves generated by the microwave generator 12 to be propagated into the interior 28 of the upstream section 22. Referring additionally to FIG. 2, the waveguide assembly 14 is shown to comprise in series a rectangular waveguide 30, a waveguide transition 32, a circular waveguide 34, and a feed horn 36. Referring additionally to FIG. 3, the waveguide transition 32 is shown to have in series a rectangular inlet end 38, a transition body 40 and a circular outlet end 42. The waveguide assembly 14 further comprises waveguide transition flanges 44 positioned at an outlet end 46 of the rectangular waveguide 30 and at the inlet end 38 of the waveguide transition 32, which provide means for attaching the ends 46, 38 together. The opposite inlet end 48 of the rectangular waveguide 30 is connected to the microwave generator 12, while the opposite outlet end 42 of the waveguide transition 32 is connected to the circular waveguide 34. Mounting flanges 50 are positioned around the circular waveguide 34 and at a waveguide assembly port 52 in the fluid pipeline 16, which provide means for attaching the waveguide assembly 14 to the fluid pipeline 16 at the port 52. The circular wave guide 34 can be packed with a low-loss dielectric material (not shown), such as a plastic polymer, to isolate the microwave generator 12 from fluid pressure in the pipeline 16.

A section of pipe, termed the port extension 54, extends from the port 52 to the fluid pipeline 16. The port extension 54 intersects the fluid pipeline 16 at a pipeline junction 56. The downstream section 20 and upstream section 22 of the fluid pipeline 16 also intersect at the pipeline junction 56 forming a tee. The tee configuration enables the pipeline junction 56 to separately receive the port extension 54, the downstream section 20 and the upstream section 22. In particular, the downstream section 20 of the fluid pipeline 16 is received by the pipeline junction 56 at the bottom end 58 of the tee, while the port extension 54 and the upstream section 22 are received by the pipeline junction 56 at the opposing top ends 60, 62 of the tee, respectively. The pipeline junction 56 functions as a right angle transition between the downstream section 20 and the upstream section 22 of the fluid pipeline 16.

The port extension 54 is in straight-line alignment with the upstream section 22 of the fluid pipeline 16, while the port extension 54 is aligned at a right angle to the downstream section 20 at the pipeline junction 56. The port extension 54 has substantially the same inside cross-sectional configuration and diameter as the upstream section 22. In the present embodiment, the port 52 and port extension 54 are positioned above the surface 24 of the marine body 26. In particular, the port 52 and port extension 54 are positioned on an offshore platform. The port 52 and port extension 54 can either be a new installation on the offshore platform or an existing conventional structure on the offshore platform which is retrofitted to serve as the port 52 and port extension 54, such as a "pig" or pipeline scraper trap.

The feed horn 36 is positioned within the pipeline junction 56 and has an inlet end 64 connected to the circular wave guide 34. The inlet end 64 has substantially the same inside cross-sectional configuration and diameter as the circular wave guide 34. The feed horn 36 has an outlet end 66 which is open into the interior 28 of the upstream section 22 to serve as a microwave distributor into the upstream section 22. The outlet end 66 of the feed horn 36 is flared outwardly to a diameter only slightly less than the inside diameter of the upstream section 22. The outlet end 66 is flared at an angle which propagates the microwaves exiting the outlet end 66 in a propagation pattern having a circular cross-section substantially corresponding to the cross-section of the outlet end 66 with a minimum of side lobe propagation. For example, the outlet end 66 of the feed horn 36 may be flared at an angle of 30° to achieve the desired propagation pattern of microwaves into the upstream section 22.

A method of operating the microwave heating system 10 is described hereafter with reference to FIG. 1. The method is applied to an offshore hydrocarbon fluid pipeline 16, wherein produced hydrocarbon fluids typically flow in a downstream direction from the upstream section 22 to the downstream section 20. The hydrocarbon fluid pipeline 16 has an existing blockage 68 at a bend 27 in the interior 28 of the upstream section 22 of the fluid pipeline 16, which is beneath the surface 24 of the marine body 26. The blockage 68 is an undesirable accumulation of an inclusion complex at the bend 27 which results from in-line conditions favoring inclusion complex formation, as are well known to the skilled artisan. The inclusion complex is typically a clathrate compound and, specifically, a gas hydrate. The blockage 68 occludes the hydrocarbon fluid pipeline 16, undesirably impeding or substantially preventing the flow of hydrocarbon fluids through the hydrocarbon fluid pipeline 16.

The method is initiated by supplying electrical power to the microwave generator 12 from the power source 18. The microwave generator 12 transmits microwaves which are propagated in a rectangular pattern through the rectangular waveguide 30 at a wavelength less than the cut-off wavelength of the hydrocarbon fluid pipeline 16. The microwaves are propagated from the rectangular waveguide 30 into the waveguide transition 32 which transitions the microwaves 70 from the rectangular pattern to a circular pattern. The microwaves are propagated from the waveguide transition 32, through the circular waveguide 34 and into the feed horn 36. The feed horn 36 feeds the microwaves through its open outlet end 66 in straight-line alignment directly into the upstream section 22 of the hydrocarbon fluid pipeline 16. The microwaves exit the outlet end 66 in an expanded circular propagation pattern 70 which substantially fills the entire cross-section of the upstream section 22 of the hydrocarbon fluid pipeline 16.

The hydrocarbon fluid pipeline 16 is formed from an electrically conductive material such as a metal and is filled with the resident fluid which is typically a low-loss dielectric material such as a gas or liquid hydrocarbon. Because the hydrocarbon fluid pipeline 16 is electrically conductive and filled with a low-loss dielectric material, the pipeline 16 effectively functions as a circular waveguide. Accordingly, the microwaves are propagated through the upstream section 22 of the hydrocarbon fluid pipeline 16 in the expanded circular propagation pattern 70. Since the direction of fluid flow through the hydrocarbon fluid pipeline 16 is normally from the upstream section 22 to the downstream section 20, the direction of microwave propagation is generally characterized as countercurrent to the direction of fluid flow through the hydrocarbon fluid pipeline 16. As the microwaves are being propagated through the hydrocarbon fluid pipeline 16, the microwaves are attenuated and dissipated by one or more of the following conditions: 1) resistance to shallow electric currents induced in the internal conductive surface of the pipeline by the electromagnetic field of the microwaves; 2) small dielectric polarization losses in low-loss dielectric materials residing in the pipeline, i.e., hydrocarbon fluids; 3) large dielectric polarization losses in high-loss dielectric materials residing in the pipeline, i.e., water, ice or gas hydrates; 4) ionic conductivity of fluids residing in the pipeline, i.e, produced brine. Attenuation and dissipation of the microwaves generates heat in the wall 72 of the hydrocarbon fluid pipeline 16 as well as in the materials residing in the hydrocarbon fluid pipeline 16. The heat generated by attenuation and dissipation of the microwaves is capable of effectively melting the gas hydrate forming the blockage 68 and diminishing or eliminating the blockage 68 from the interior 28 of the upstream section 22.

The amount of heat generated by the microwaves is proportional to the rate of absorption of microwave energy by the pipeline environment in which the microwaves are propagated. Since high-loss dielectric materials in the pipeline environment absorb a substantially larger amount of microwave energy relative to the low-loss dielectric materials, the microwave heating system 10 generates locally concentrated heating at specific locations in the hydrocarbon fluid pipeline 16 where high heat is most required, i.e., where liquid phase water or solid-phase ice or gas hydrates are present. An operational advantage of the microwave heating system 10 is that sufficient heat is generated to melt gas hydrates even when the hydrocarbon fluid pipeline 16 is maintained at its standard operating pressure. Therefore, operation of the system 10 does not necessitate depressurizing the hydrocarbon liquid pipeline 16 to reduce the melting point of the gas hydrate blockage 68. Pipeline depressurizing is an inherent safety risk because typically the practitioner is only able to access and depressurize the pipeline 16 on one side of the blockage 68. When the blockage 68 gives way, rapid expansion occurs within the pipeline 16 which creates a significant potential for damage to the pipeline 16.

Figure 4:
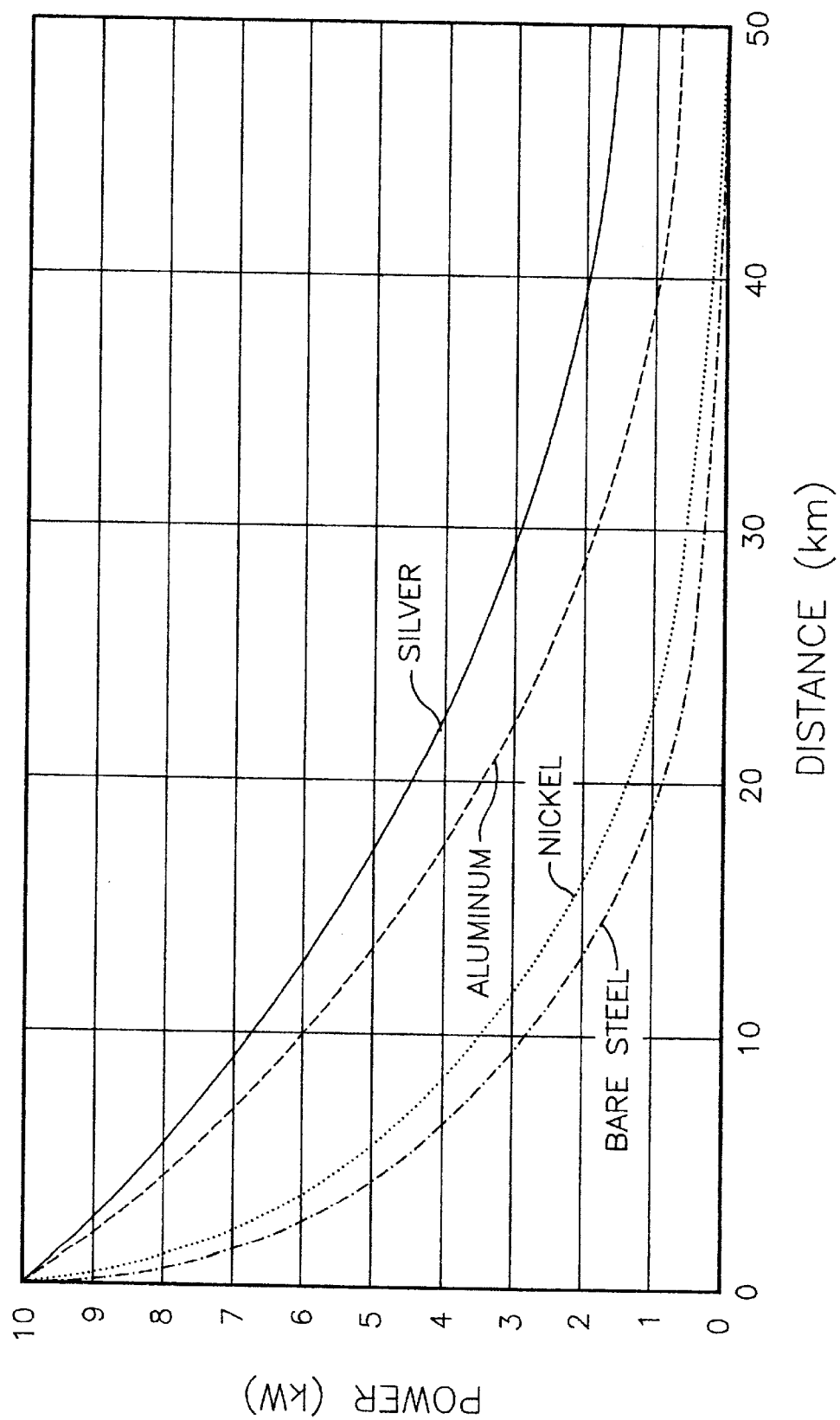
FIG. 4 is a graphical depiction of microwave power transmission in a fluid pipeline as a function of pipeline length.

The above-described method is a remedial mode of operating the microwave heating system 10, wherein the system 10 is only activated intermittently in response to the occurrence of actual gas hydrate blockages in the hydrocarbon fluid pipeline 16. An alternate method provides for a preventive mode of operating the microwave heating system 10, wherein the system 10 is continuously active to inhibit gas hydrate formation before actual blockages occur in the hydrocarbon fluid pipeline 16. Both operating modes are effective for remediating gas hydrate blockages or inhibiting gas hydrate formation, respectively, in extended lengths of hydrocarbon fluid pipeline. FIG. 4 shows the practical length limits of operation for a microwave heating system employing a 10 kW microwave generator having a primary microwave heating frequency of 2.5 GHz, which is coupled into one of a plurality of 8 inch ID, circular pipelines constructed from different metals. The practical length limit is defined as the point in the pipeline where 90% power dissipation occurs. Thus, for example, the practical length limit for effectively employing the microwave heating system of FIG.

4 in a bare steel pipeline in accordance with the above-recited parameters is about 20 km.

Figure 5:
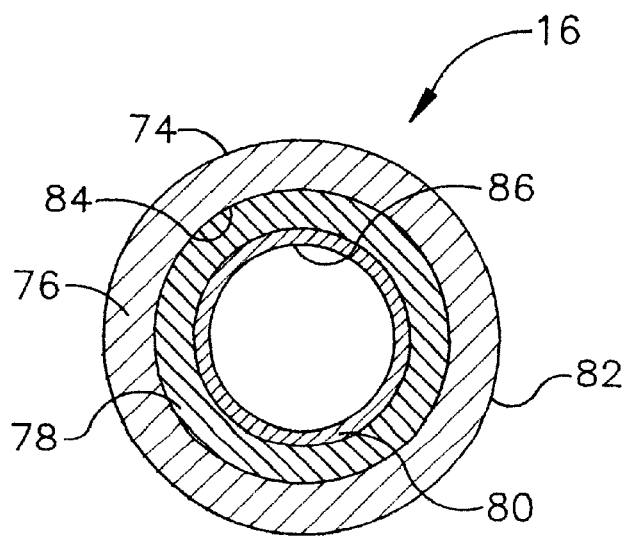
FIG. 5 is a schematic cross-sectional view of a wall of a fluid pipeline employed in a microwave heating system of the present invention.

An alternate construction for the fluid pipeline 16, described hereafter with reference to FIG. 5, can be employed to substantially increase the practical length limit of the fluid pipeline 16 and correspondingly to increase the upstream distance through the fluid pipeline 16 which the microwaves can be transmitted to distances of 50 km or more. The fluid pipeline 16 is shown having a pipe wall 74 which employs a multi-layer construction. The pipe wall 74 comprises an external layer 76, an intermediate layer 78, and an internal layer 80. The external layer 76 is the primary structural layer for supporting the fluid pipeline 16. The structural external layer is preferably formed from a high-strength durable material such as steel. The outside face 82 of the external layer 76 may be in direct contact with the outside environment in which the fluid pipeline 16 resides, or the outside face 82 may be provided with a protective sheath (not shown) of heat insulative material or some otherwise protective material. The external layer 76 of the pipe wall 74 is very thick relative to the intermediate and internal layers 78, 80. The intermediate layer 78 is a thin coating of a material over the inside face 84 of the external layer 76. The internal layer 80 has an inside face 86 which is in direct contact with the fluids being conveyed through the interior 28 of the upstream section 22.

The material of the intermediate layer 78 is substantially less resistant to transmission of microwaves and conversely less conducive to dissipation of microwaves than the material of the external layer 76. For example, the material of the external layer 76 can be steel, as recited above, while the material of the transmissive intermediate layer 78 can be aluminum which, as indicated in FIG. 4, is substantially less resistant to transmission of microwaves than steel. The internal layer 80 is a thin layer of low-loss dielectric material coating the intermediate layer 78 on the opposite side of the external layer 76 which provides a corrosion barrier. For example, the material of the internal layer 80 can be a corrosion resistant plastic or an epoxy. The pipe wall 74 is constructed by first applying the intermediate layer 78 to the inside face 84 of the external layer 76 by a conventional coating method such as flame spraying. The internal layer 80 is then applied over the intermediate layer 78.

The distance upstream through the fluid pipeline 16 which the microwaves can be transmitted can alternately be substantially increased by increasing the power output of the microwave generator 12. The degree to which the power output of the microwave generator 12 can be increased is limited by the degree of pipeline resistance to shallow surface currents induced by the electromagnetic field of the microwaves and the temperature limits of the external insulation, if any, surrounding the fluid pipeline 16 near the microwave generator 12. Nevertheless, these limitations are typically not unduly constraining for the applications described herein. For example, a microwave heating system employing a 10 kW microwave generator which is coupled into an 8 inch ID steel pipeline would have an average pipe wall heat flux of only about 0.3 Btu/hr-ft$^2$ over the first km of the pipeline, which generally would not produce excessive pipe wall temperatures if the pipeline has standard external insulation.

Figure 6:
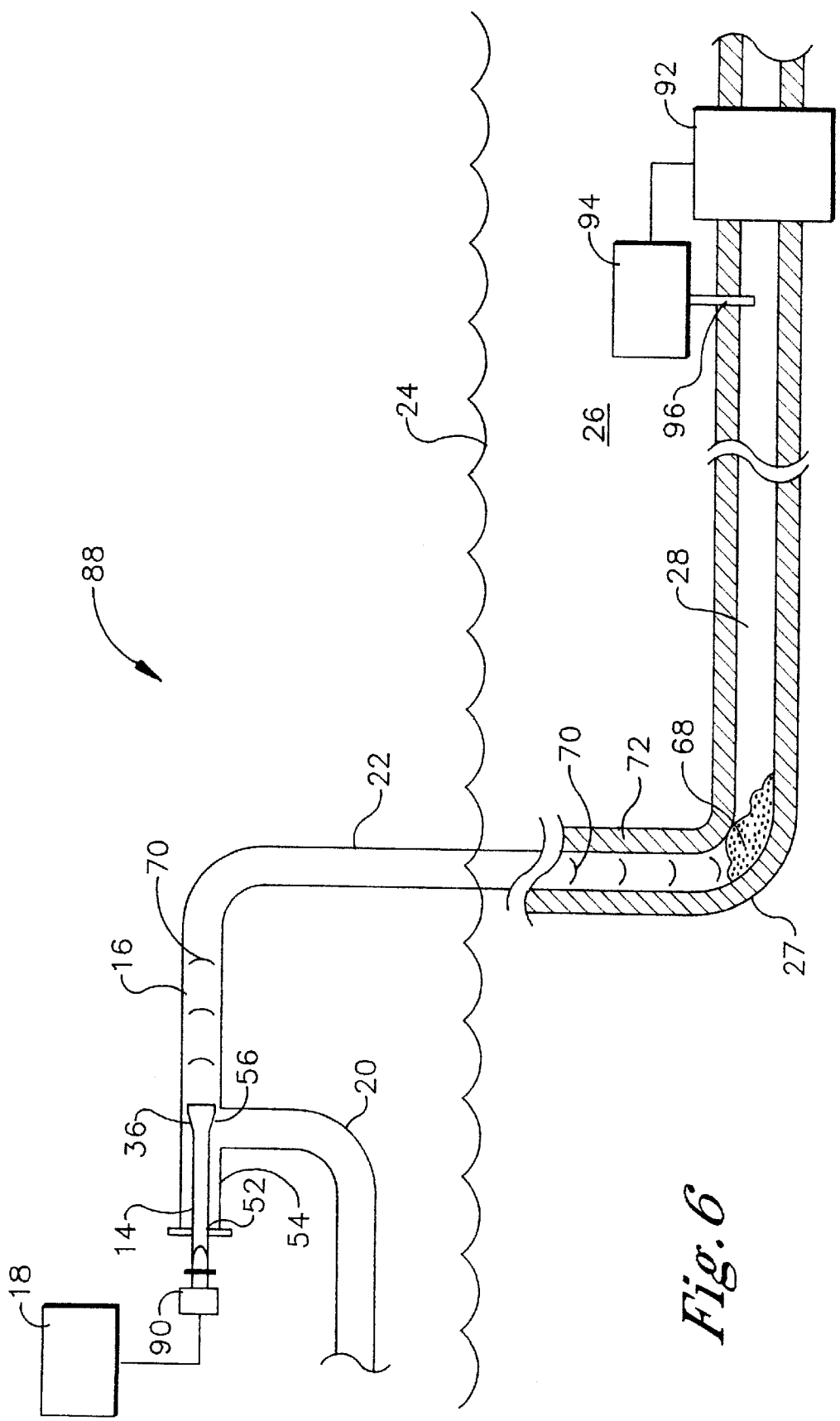
FIG. 6 is schematic view of an alternate microwave heating system of the present invention including an upstream section of a fluid pipeline in cut-away view.

The microwave heating system 10 may be modified in accordance with a number of embodiments for added utility within the scope of the present invention. Referring to FIG. 6, an alternate microwave heating system of the present invention is shown and generally designated 88. The microwave heating system 88 has substantially the same waveguide assembly 14 as the microwave heating system 10. However, the microwave heating system 88 has a modified microwave generator 90. In particular, the microwave generator 90 has been modified in a manner within the purview of the skilled artisan to include means for performing either amplitude modulation or frequency modulation of the microwave signals generated by the microwave generator 90.

In accordance with the present embodiment, the microwave generator 90 initially generates the microwave signals which are then modulated by the microwave generator 90 to embed information therein. The modulated microwave signals are propagated through the upstream section 22 of the fluid pipeline 16 and function in substantially the same manner as described above with reference to the system 10, inhibiting or removing gas hydrate blockages. A remote device 92 is also positioned at a point on the upstream section 22 which receives the modulated microwave signals. The information embedded in the microwave signals is preferably telemetry or control information which is communicated to the remote device 92, providing a telemetry or control function. For example, the remote device 92 could be a shut-in valve, a variable choke, or some other electromechanical device on a subsea well (not shown). The modulated microwave signals are propagated through the upstream section 22 to the remote device 92 and communicate a control instruction to the remote device 92 which enables remote opening or shutting of the well or remote adjustment of the variable choke.

The microwave generator 90 can be modified in an alternate manner from that described above to provide yet another embodiment of a microwave heating system of the present invention. In particular, the microwave generator 90 is modified in a manner within the purview of the skilled artisan to include means which simultaneously generate secondary signals in addition to the primary microwave signals generated by the microwave generator 90. The microwave generator 90 further includes means for performing either amplitude modulation or frequency modulation of the secondary signals.

In accordance with the present embodiment, the microwave generator 90 initially generates the primary microwave signals and propagates the primary microwave signals in an unmodulated state through the upstream section 22 of the fluid pipeline 16. The unmodulated primary microwave signals function in substantially the same manner as described above with reference to the system 10, inhibiting or removing gas hydrate blockages. The secondary signals are simultaneously generated by the microwave generator 90 and are preferably distinguished from the primary microwave signals by having a higher secondary frequency than the primary microwave heating frequency. The secondary signals are amplitude or frequency modulated by the microwave generator 90 to embed information therein and propagated through the upstream section 22 to the remote device 92. The remote device 92 receives the modulated secondary signals which provide a telemetry or control function in substantially the same manner as described above with reference to the modulated microwave signals of the previous embodiment.

In still another embodiment of the present invention, either of the microwave heating systems 10 or 88 can be employed to power a remote electrical storage battery 94 positioned at a point on the upstream section 22 of the fluid pipeline 16 in association with a remote device 92. The electrical storage battery 94 is provided with a small "stub" antenna or other power absorbing means 96 which absorbs power from the microwave signals to charge the battery 94. The battery 94 supplies electrical power to the remote device 92, enabling effective operation of the remote device 92.

Various embodiments of the present invention have been disclosed above in the context of subsea applications, wherein the microwave heating system includes a hydrocarbon fluid pipeline having a downstream section positioned on an offshore platform and an upstream section extending beneath the surface of a marine body. However, the disclosed subsea applications of the invention are provided for illustrative purposes and are not necessarily intended to limit the invention. For example, it is apparent to the skilled artisan from the teaching herein that the present invention is applicable not only to offshore deep water hydrocarbon pipelines, but also to subsea oil and gas well production flow lines. Furthermore, the present invention is not limited solely to subsea applications. The present invention may be generally applicable to substantially any pipeline which is susceptible to gas hydrate formation. The present invention has also been characterized by countercurrent microwave propagation through the hydrocarbon fluid pipeline relative to the direction of fluid flow. The present invention, however, is not limited to countercurrent microwave propagation, but is likewise applicable to co-current microwave propagation through the hydrocarbon fluid pipeline, wherein the microwaves are propagated in the same direction as fluid flow through the hydrocarbon fluid pipeline.

While the foregoing preferred embodiments of the invention have been described and shown, it is understood that alternatives and modifications, such as those suggested and others, may be made thereto and fall within the scope of the present invention. Furthermore, although examples have been provided herein to demonstrate the scope and utility of the present invention, the examples are not to be construed as limiting the scope of the invention.

I claim:

1. A method for removing or inhibiting the formation of inclusion complexes in a hydrocarbon fluid pipeline comprising:

generating microwave signals;

transmitting said microwave signals through a waveguide assembly having an outlet fitted with a microwave distributor, wherein said microwave distributor is positioned in a fluid pipeline at a junction between an upstream section and a downstream section of said pipeline, and wherein said upstream section has a pipe wall comprising a structural layer formed from a first material and a transmissive layer formed from a second material, said transmissive layer being substantially less resistant to transmission of said microwave signals than said structural layer;

propagating said microwave signals from said microwave distributor through said upstream section of said fluid pipeline to substantially heat said upstream section, wherein said second material dissipates said microwave signals to a lesser degree than said first material, thereby extending a propagation distance of said microwave signals from said microwave distributor through said upstream section.

2. The method of claim 1 wherein said microwave distributor is contacted with fluids passing through said junction from said upstream section to said downstream section.

3. The method of claim 1 wherein said microwave signals are propagated from said microwave distributor into said upstream section in substantially straight line alignment proximal to said junction.

4. The method of claim 1 wherein said downstream section is in substantially right angle alignment with said upstream section proximal to said junction.

5. The method of claim 1 said microwave signals have a propagation pattern and said propagation pattern is conformed to an internal configuration of said upstream section.

6. The method of claim 1 wherein said upstream section has a substantially continuous open cross-section proximal to said junction.

7. The method of claim 1 wherein said upstream section is heated to a temperature above the melting point of inclusion complexes at a distance up to about 50 km from said junction.

8. The method of claim 1 wherein said pipe wall further comprises a corrosion resistant layer, said transmissive layer positioned between said structural layer and said corrosion resistant layer, and further wherein said corrosion resistant layer is formed from a relatively corrosion resistant material to provide a corrosion barrier.

9. The method of claim 8 wherein said corrosion resistant layer is formed from a low-loss dielectric material.

10. The method of claim 8 wherein said corrosion resistant layer is a coating on said transmissive layer.

11. The method of claim 1 wherein said microwave signals are propagated through said upstream section in a countercurrent direction relative to a normal flow direction of fluids through said upstream section.

12. The method of claim 1 wherein said microwave signals are propagated through said upstream section in a co-current direction relative to a normal flow direction of fluids through said upstream section.

13. The method of claim 1 wherein said transmissive layer is a coating on said structural layer.

14. The method of claim 1 wherein said first material is steel.

15. The method of claim 1 wherein said second material is aluminum.

16. The method of claim 1 wherein said structural layer is substantially thicker than said transmissive layer.

17. A method for removing or inhibiting the formation of inclusion complexes in a hydrocarbon fluid pipeline while controlling a function of a remote device, the method comprising:

generating microwave signals;

frequency or amplitude modulating said microwave signals to embed information in said microwave signals;

transmitting said modulated microwave signals through a waveguide assembly having an outlet positioned at a junction between an upstream section and a downstream section of said pipeline;

propagating said modulated microwave signals through said upstream section of said fluid pipeline to substantially heat said upstream section; and propagating said modulated microwave signals to a remote device positioned at a point on said upstream section, wherein said remote device responds to said information embedded in said modulated microwave signals.

18. The method of claim 17 wherein said remote device is a flow control device and said information is a control instruction causing said remote device to control flow in said upstream section in response to said control instruction.

19. A method for removing or inhibiting the formation of inclusion complexes in a hydrocarbon fluid pipeline while controlling a function of a remote device, the method comprising:

generating primary microwave signals;

transmitting said primary microwave signals through a waveguide assembly having an outlet positioned at a junction between an upstream section and a downstream section of said pipeline;

propagating said primary microwave signals through said upstream section of said fluid pipeline to substantially heat said upstream section;

generating secondary signals;

frequency or amplitude modulating said secondary signals to embed information in said secondary signals;

transmitting said modulated secondary signals through said waveguide assembly;

propagating said modulated secondary signals to a remote device positioned at a point on said upstream section, wherein said remote device responds to said information embedded in said modulated secondary signals.

20. The method of claim 19 wherein said remote device is a flow control device and said information is a control instruction causing said remote device to control flow in said upstream section in response to said control instruction.

21. A method for removing or inhibiting the formation of inclusion complexes in a hydrocarbon fluid pipeline while powering a remote device, the method comprising:

generating microwave signals;

transmitting said microwave signals through a waveguide assembly having an outlet positioned at a junction between an upstream section and a downstream section of said pipeline;

propagating said microwave signals through said upstream section of said fluid pipeline to substantially heat said upstream section;

propagating said microwave signals to a power absorbing means positioned at a point on said upstream section, wherein said power absorbing means is coupled with an electrical storage battery positioned at said point;

absorbing power from said microwave signals with said power absorbing means and charging said electrical storage battery with said absorbed power; and powering an electrically-powered remote device with said electrical storage battery, wherein said remote device is coupled with said electrical storage battery and is positioned at said point.

22. The method of claim 21 wherein said remote device is a flow control device and said information is a control instruction causing said remote device to control flow in said upstream section in response to said control instruction.

* * * * *